United States Patent
Scherg et al.

(10) Patent No.: US 7,163,071 B2
(45) Date of Patent: Jan. 16, 2007

(54) METHOD FOR OPERATING A NON-RAILBOUND LAND VEHICLE WITH A COMBUSTION ENGINE-GENERATOR UNIT AND AN ELECTRIC DRIVE MOTOR AND CORRESPONDING VEHICLE

(75) Inventors: Christof Scherg, Penzberg (DE); Werner Weck, Starnberg (DE); Peter Ehrhart, München (DE)

(73) Assignee: Magnet-Motor Gesellschaft fur Magnetmotorische Technik mbH, Starnberg (DE)

( * ) Notice: Subject to any disclaimer, the term of this patent is extended or adjusted under 35 U.S.C. 154(b) by 265 days.

(21) Appl. No.: 10/451,387

(22) PCT Filed: Dec. 18, 2001

(86) PCT No.: PCT/EP01/14935

§ 371 (c)(1),
(2), (4) Date: Oct. 22, 2003

(87) PCT Pub. No.: WO02/051663

PCT Pub. Date: Jul. 4, 2002

(65) Prior Publication Data

US 2004/0040757 A1    Mar. 4, 2004

(30) Foreign Application Priority Data

Dec. 22, 2000  (DE)  ............... 100 64 188

(51) Int. Cl.
  *B60K 1/00*   (2006.01)
  *B60L 11/12*  (2006.01)
  *H02P 9/04*   (2006.01)

(52) U.S. Cl. ............ 180/65.2; 180/65.4; 290/17; 290/40 C

(58) Field of Classification Search ............... 180/65.1, 180/65.2, 65.3, 65.4, 65.5, 65.8; 290/17, 290/40 C, 40 R, 40 D, 51; 322/18, 13, 25, 322/17; 318/139, 141, 158; 701/22, 54; B60L 11/02; F02D 29/06; H02P 9/00, 9/10; B60K 6/02, B60K 17/12, 41/28

See application file for complete search history.

(56) References Cited

U.S. PATENT DOCUMENTS 5,352,971 A  10/1994  Nishimura
(Continued)

FOREIGN PATENT DOCUMENTS

DE        40 00 678 A1        7/1991
(Continued)

*Primary Examiner*—Christopher P. Ellis
*Assistant Examiner*—John Walters
(74) *Attorney, Agent, or Firm*—Venable LLP; Robert Kinberg; Ryan Flandro

(57) ABSTRACT

The invention relates to a non-railbound land vehicle (2) comprising a drive system with the following components; a combustion engine-generator unit (=VG unit) (14, 16); at least one electric drive motor (18, 20); a power control station (30) for the electric motor that can be operated by the driver of the vehicle and a control electronics (24) that is connected to the VG unit, the electric motor and the power control station. The invention is characterized in that the control electronics is configured and can operate in such a way that it reduces temporarily the electrical power demanded by the electric motor and/or at least one secondary current consumer for the transition from one operating phase with a first power state of the electric motor and/or at least one secondary current consumer (26) of the vehicle to an operating phase with a higher, second power state of the electric motor and/or at least one secondary current consumer in order to attain fster transition of the combustion engine (14) from a first power output to a higher second power output.

11 Claims, 2 Drawing Sheets

U.S. PATENT DOCUMENTS

| | | | |
|---|---|---|---|
| 5,473,228 A * | 12/1995 | Nii | 318/158 |
| 5,621,304 A * | 4/1997 | Kiuchi et al. | 322/18 |
| 6,054,844 A * | 4/2000 | Frank | 322/16 |
| 6,055,466 A * | 4/2000 | Grewe | 701/22 |
| 6,067,801 A * | 5/2000 | Harada et al. | 60/705 |
| 6,116,363 A * | 9/2000 | Frank | 180/65.2 |
| 6,190,282 B1 * | 2/2001 | Deguchi et al. | 477/5 |
| 6,209,672 B1 * | 4/2001 | Severinsky | 180/65.2 |
| 6,253,127 B1 * | 6/2001 | Itoyama et al. | 701/22 |
| 6,326,702 B1 * | 12/2001 | Yonekura et al. | 290/40 C |

FOREIGN PATENT DOCUMENTS

| | | | |
|---|---|---|---|
| DE | 42 05 770 C2 | | 5/1994 |
| EP | 0 556 942 | | 8/1993 |
| EP | 0 647 541 | | 4/1995 |
| EP | 0 698 521 | | 2/1996 |
| EP | 0 782 941 | | 7/1997 |
| EP | 0 796 758 | | 9/1997 |
| JP | 58051239 A | * | 3/1983 |
| JP | 2003020972 A | * | 1/2003 |
| WO | WO009116532 A1 | * | 10/1991 |

* cited by examiner

METHOD FOR OPERATING A NON-RAILBOUND LAND VEHICLE WITH A COMBUSTION ENGINE-GENERATOR UNIT AND AN ELECTRIC DRIVE MOTOR AND CORRESPONDING VEHICLE

The invention relates to a method for operating a non-rail bound land motor vehicle which has a drive system with the following components:

an internal combustion engine-generator unit;
at least one electric drive motor;
a power command signal generator, which can be operated by the driver of the motor vehicle, for the electric motor;
and an electronic control system which is connected to the internal combustion engine-generator unit, to the electric motor and to the power command signal generator, the internal combustion engine-generator unit being controlled by means of the electronic control system in such a way that the motor vehicle is operated in the essentially steady-state operating phases in each case with a combination of supplied torque and rotational speed of the internal combustion engine which is favorable for fuel consumption.

In order to explain the invention, there will firstly be an explanation of how the driver's desire for higher power is implemented in conventional, non-rail bound land motor vehicles, i.e. motor vehicles with an internal combustion engine and mechanical drive train to the driven wheels without an electric drive motor. Understanding the processes which occur in this context will facilitate understanding of the subsequent explanation of the invention.

If the driver of a conventional motor vehicle desires a higher drive power, for example the desire for an increase in velocity or the desire not to decrease velocity when traveling up a positive gradient, he presses what is referred to as the gas pedal into a lower position. In a spark ignition engine this leads to a greater degree of opening of a throttle valve in the intake system and in a diesel engine this leads to an increase in the fuel injection quantity per working cycle and cylinder. In both cases, the internal combustion engine "reacts" with an increase in the torque supplied by it. The rotational speed of the internal combustion engine is at the beginning still the same as before but the higher power which is now supplied (=torque multiplied by rotational speed) is available at the drive wheels of the motor vehicle. The desired result, that is to say for example an increase in the velocity of the vehicle or avoidance of the vehicle becoming slower on a positive gradient, can thus be brought about.

If, on the other hand, before the driver's desire for an increase in power, the motor vehicle has already been operated with a power output level which is near to the associated maximum torque output level of the internal combustion engine, the motor vehicle will no longer react to the driver's desire for an increase in power, or will react only over the course of a considerable time period. The motor vehicle can virtually no longer change, or then only change slowly, to a higher travel velocity; it is not possible to prevent a reduction in the travel velocity when traveling up a positive gradient (in which case, in order to facilitate the method of consideration, the possibility of shifting down into a lower gear, and thus searching for an operating point of the internal combustion engine with a higher torque capacity, is not considered).

There is basically not much difference when traveling with a land motor vehicle which contains an internal combustion engine-generator unit and at least one electric drive motor (in which case the feature of operating with a torque/rotational speed combination—contained in the initial paragraph—with a favorable fuel consumption is not taken into consideration for the sake of easier initial understanding). If the driver desires a higher power output level, for example in the aforesaid travel situations, he moves the power command signal generator, for example a foot pedal, into a situation which represents the power demand P2 (P2 being greater than the previous power demand P1). As the drive power in the case of the motor vehicle with an internal combustion engine-generator unit and electric drive motor also ultimately originates from the internal combustion engine, the internal combustion engine must be changed to a higher power output level. However, it is actually an indication of a technically good motor vehicle with internal combustion engine-generator unit and electric drive motor that in many operating situations it is operated with an internal combustion engine which works close to the respective maximum torque because customary internal combustion engines have the specifically lowest fuel consumption in this characteristic diagram region. In this situation, the driver of the motor vehicle with an internal combustion engine-generator unit and electric drive motor behaves entirely similarly to the driver of a conventional motor vehicle which also no longer has any power reserves when the throttle is opened: at most it can still implement the increased power demand laboriously and spread over a not inconsiderable period of time. In the case of a motor vehicle which is operated in the essentially steady-state operating phases with a torque/rotation speed combination which is favorable for consumption, these situations of the "lack of the possibility of quickly implementing a higher power demand" are particularly frequent.

The invention is based on the object of making available a method for operating a land motor vehicle which has the features specified at the beginning and which permits a rapid transition to a higher power state.

In order to achieve this object, the method is characterized in that for the transition from an operating phase with a first power state of the electric motor and/or at least one secondary current load of the motor vehicle to an operating phase with a higher, second power state of the electric motor and/or at least one secondary current load, the electrical power demanded by the electric motor and/or by at least one secondary current load is temporarily reduced in order to achieve a faster transition of the internal combustion engine from a first power output level to a higher, second power output level.

The temporary reduction, according to the invention, in the electrical power demanded by the electric motor and/or at least one secondary current load leads to a situation in which the internal combustion engine suddenly has "power to spare" and can therefore convert this excess power into an immediate increase in rotational speed. Overall, the internal combustion engine thus quickly reaches a higher power output level, i.e. a level of outputable power corresponding to a higher rotational speed multiplied by the torque which corresponds to the combination which is favorable for the fuel consumption. By terminating the reduction in the demand for electrical power, the increased power output of the internal combustion engine becomes available to drive the motor vehicle. It is preferred if these processes occur within the shortest possible time, there being of course an interaction between the magnitude of the reduction in the demand for electrical power and the necessary time period until the higher power output level is reached, and of course also a dependence on the power difference between the first power state and the second power state. A small magnitude of the reduction in the demand for electrical power and a large difference between the power states tend to increase the time period of the temporary reduction in the demand for electrical power. The "steepness of the signal edges" involved in the reduction in the demand for electrical power and in the increase in the supply of electrical power to the electric motor and/or the secondary current load at the end of the transition are also significant. As a rule, it will be possible to make the configuration such that the time period of the temporary reduction in the demand for electrical power is shorter than 1 sec, frequently even less than 0.5 sec, at least for differences in the power states which are not unusually large.

Where the term "secondary current load" is used in the claims, preferably secondary current loads are meant which have a considerable power demand, preferably measured with respect to the average or maximum power demand of the electric drive motor or of the electric drive motors. It would be possible, for example, to define "power demand of the secondary current load lies above a threshold value". Or, it would be possible to define, for example, "power demand is more than 5%, preferably more than 10%, at most preferably more than 30% of the average or of the maximum power demand of the electric drive motor or of the sum of the electric drive motors". In some of the cases, the significant factor is the power demand of an individual secondary current load, and in other cases the significant factor is the sum of the secondary current loads which have just been switched on. To give a useful example:

A truck is assumed to have electric drive motors with a maximum power, in total, of 300 kW. Whether or not one windshield wiper motor or two fog lights or a venting fan for the front windshield is switched on is virtually insignificant for the overall system. On the other hand, if the truck has a compressor with a power of 40 kW for a refrigerating system for refrigerated cargo space and if the refrigerating compressor is driven electrically, whether the refrigerating compressor is switched on or not, or whether it is operated, for example, with its full power or with reduced power, is entirely significant for the overall system. Furthermore, a distinction is appropriately made between secondary current loads which are necessary for operation, for example an electrically driven fan for the cooling water of the internal combustion engine, and secondary current loads whose operation can be interrupted without difficulty for a time phase or reduced in power, for example, the electrically driven refrigerating compressor already referred to.

If the power state transition is triggered by switching on a secondary current load which was previously out of operation, a different secondary current load and/or the electric motor must be used to reduce the power demand. If, on the other hand, the power state transition is triggered by switching higher a secondary current load which was already previously in operation, the temporary reduction, according to the invention, in the power demand can be carried out additionally or alternatively at this secondary current load.

With respect to the power state transition in conjunction with the reduction in the demand for electrical power, it is possible to distinguish 9 cases:

1. The electric drive motor is to change to a higher power state. For this purpose, the electrical power demanded by this electric drive motor is firstly temporarily reduced. This is quite a particularly important case of the configuration of the method according to the invention and of the motor vehicle according to the invention.

2. A secondary current load of considerable power is either switched on or its power demand increased. For this purpose, the electrical power demanded by the electric drive motor is temporarily reduced.

3. Both the electric drive motor is to be changed to a higher power state and the secondary current load of considerable power is to be switched on or switched to a higher power. For this purpose, the electrical power demanded by the electric motor is temporarily reduced (as it were the sum of cases 1 and 2).

4. The electric drive motor is to be changed to a higher power state. For this purpose, the electrical power demanded by a secondary current load of considerable power is temporarily reduced. This is also a particularly important configuration of the method according to the invention and of the motor vehicle according to the invention.

5. A secondary current load of considerable power is to be switched on or changed to a higher power. For this purpose, the demand for electrical power by the latter and/or by another secondary current load is temporarily reduced.

6. Both the electric drive motor is to be changed to a higher power state and a secondary current load of considerable power is to be switched on or switched to a higher power. For this purpose, the electrical power demanded by a secondary current load of considerable power is temporarily reduced.

7, 8, 9. These cases arise from cases 1, 2, 3 (or else from cases 4, 5, 6) if the demand for electrical power is temporarily reduced not solely at the electric drive motor or solely at a secondary current load, but instead both at the electric drive motor and at a secondary current load.

In particular when the electrical power of a secondary current load is reduced, the word "reduction" also includes the lower limiting case of the "reduction to 0", that is to say switching off. In particular in the case of the secondary current load the term "first power state of the secondary current load" also includes the lower limiting case of being switched off.

The motor vehicle according to the invention can have a plurality of electric drive motors, a left-handed electric drive motor for a left-handed front wheel or rear wheel and a right-handed electric drive motor for a right-handed front or rear drive wheel being particularly typical examples (likewise a counterexample which can be satisfactorily implemented is a common electric drive motor for two front wheels or for two rear wheels). There is also the possibility of a three-wheeled vehicle, with front-wheel or rear-wheel drive. Electric motors for all-wheel drive are also possible.

In the claims, the term "power command signal generator" is used intentionally instead of, for example, "travel pedal" (corresponding to the "gas pedal" in conventional motor vehicles). The power command signal generator could of course also be an element which can be operated manually or else a power command signal generator which can be operated by voice control. In particular in the case of power command signal generators which can be activated by foot or manually, an implementation will often be selected in which the setting (angular setting or translatory setting) of the power command signal generator which is instantaneously selected by the driver by means of operator control supplies an instantaneous signal which represents the instantaneous power demand of the driver. However, other embodiments are also conceivable, in particular a sequential embodiment (press once for a first power level, press once more for a second power level, etc) or configurations in the manner of an electronic clock (press once and the selected power level increases by 1; press for a relatively long time and the selected power level always increases in each case by 1 until the driver leaves the power command signal generator).

The expression "essentially steady-state operating phases of the motor vehicle" means operating phases in which, considered over time, the power demand does not change or changes extremely slowly or to an extremely small degree over time. The expression "favorable for fuel consumption" is intended to include the case of the precisely minimum fuel consumption for the demanded power and the cases near to the precisely minimum fuel consumption for the demanded power. Specifically, the last-mentioned cases are preferably less than 10%, more preferably less than 5% and at most preferably less than 3% above the precisely minimum fuel consumption.

The feature "traveling in each case with a combination of supplied torque and rotational speed of the internal combustion engine which is favorable for fuel consumption" will now be explained as follows: If the torque M is plotted on the ordinate and the rotational speed on the abscissa in a coordinate system and a group of curves of constant power is entered in this coordinate system, the curves of constant power are, expressed in rough terms, hyperbolic; a curve of relatively large constant power lies further away from the zero point of the coordinate system than a curve of relatively small constant power. A demanded power level of the internal combustion engine can basically be implemented using the product of different rotational speeds and torques.

$$P = 2\pi \times M_1 \times n_1 = 2\pi \times M_2 \times n_2 = \ldots$$

As a specific numerical example:

Power P demanded by the internal combustion engine is 200 kW, which can either be generated from 500 Nm at approximately 3800 min$^{-1}$ or can be generated from 750 Nm at approximately 2400 min$^{-1}$. Curves of identical specific consumption (referred to as "conchoid curves"), the unit typically being g fuel per kWh, can be entered into the same coordinate system, and also the point of the absolute lowest specific consumption. Only one of the curves of constant power passes precisely through the point of the absolute lowest specific consumption. In the described diagram it is then possible to find, for each demanded power level P, a combination of torque and rotational speed which is the absolute lowest in terms of consumption for this power, or near to it. As a rule, one is then at a point on the diagram which is to some extent near to the torque-rotational speed curve when the internal combustion engine is at full load. Furthermore, this point is generally at more or less the lowest rotational speed at which the demanded power P can still be set. The described relationships are known to the average person skilled in the art of internal combustion engines, but have been presented here in conjunction with the invention in order to achieve a more convenient understanding of the present application.

Specifically it is necessary to imagine that the internal combustion engine-generator unit has a controller which changes the internal combustion engine and thus the entire internal combustion engine-generator unit continuously (in a new essentially steady-state operating phase) to the desired combination of torque and rotational speed which is favorable for fuel consumption.

In the previous description, details have intentionally been given only on the transition from a relatively low power state to a relatively high power state. At the transition from a relatively high power state to a relatively low power state, that is to say, for example, the desire of the driver to reduce the velocity or the desire of the driver for the velocity not to increase when traveling down a road with a negative gradient or to switch off a high-power secondary current load, there is no occurrence of a problem similar to that stated previously for the poor ability of the vehicle to implement the desire for higher power. A corresponding signal of the power command signal generator and/or switching off the secondary current load signifies a reduction in the demand for electrical power. As a result, the internal combustion engine changes to a lower power output level. The electronic control system ensures that the combination of torque and rotational speed which is favorable for consumption is also set for the new, essentially steady-state operating phase.

If the motor vehicle has a plurality of electric drive motors and there is a desire to carry out a temporary reduction, it is generally most preferred to perform the reduction, according to the invention, in the demand for electrical power at all these electric drive motors. However, there are also embodiments in which this reduction is performed only at one electric motor or only at some of the electric motors, for example only at the electric motor or the electric motors for the driven front wheels and not at the electric motor or the electric motors for the driven rear wheels. If the motor vehicle has a plurality of high-power secondary current loads and there is a desire to perform a temporary reduction, it is generally most preferred to perform the reduction in the demand of electrical power at one secondary current load or at a small number of secondary current loads which are dispensable at that particular time.

In terms of the device, the subject matter of the invention is a non-rail bound land motor vehicle which has a drive system with the following components:

an internal combustion-generator unit;
at least one electric drive motor;
a power command signal generator, which can be operated by the driver of the motor vehicle, for the electric motor;
and an electronic control system which is connected to the internal combustion-generator unit, to the electric motor and to the power command signal generator, the electronic control system being embodied and being capable of operating in such a way that the internal combustion engine-generator unit is controlled in such a way that the motor vehicle is operated in the essentially steady-state operating phases in each case with a combination of supplied torque and rotational speed of the internal combustion engine which is favorable for fuel consumption, characterized in that the electronic control system is embodied and capable of operating in such a way that, for the transition from an operating phase with a first power state of the electric motor and/or at least one secondary current load of the motor vehicle to an operating phase with a higher, second power state of the electric motor and/or of the secondary current load, it temporarily reduces the electrical power demanded by the electric motor and/or by the secondary current load in order to achieve a faster transition of the internal combustion engine from a first power output level to a higher, second power output level.

Everything which has been stated above in conjunction with the aspect of the invention according to the method, in particular with respect to the technical function of the inventive features, with respect to the statement of the object of the invention, with respect to the explanation of certain terms and with respect to more specific embodiment possibilities, also applies to the aspect of the invention relating to the device.

In the case of the motor vehicle, the electronic control system is preferably embodied and capable of operating in such a way that the magnitude and/or the duration of the reduction in the demand for electrical power vary as a function of the difference between the first power state and the second power state. The greater the difference between the first power state and the second power state, the greater and/or more enduring will it be necessary to make the reduction in the demand for electrical power, there being a reciprocal relationship between the magnitude and duration.

In the motor vehicle according to the invention, the electronic control system is preferably embodied and capable of operating in such a way that, during the transition from the first power output level of the internal combustion engine to the second power output level of the internal combustion engine, it dynamically adapts the reduction in the demand for electrical power to the instantaneous difference between the instantaneous power level of the internal combustion engine and the second power output level of the internal combustion engine. If, for example, half of the transition from the first power output level to the second power output level has already been "done", the reduction in the electrical power demanded by the electric motor can already be partially reversed. The entire operation must preferably be conceived as a continuous process which is nonincremental or occurs with small increments. Overall, the invention gives rise to self-stabilization, either with or without the described "dynamic adjustment". When there are any power deficits which are also unforeseen, for example faults in the internal combustion engine, a fault in the fuel supply to the internal combustion engine, fluctuations in the drive power, connection of secondary loads which are driven mechanically by the internal combustion engine or driven electrically, a stable operating point is reached again quickly.

Preferably an electronic modification device with which signals of the power command signal generator and/or the signals which reflect the power consumption of the secondary current load can be converted into signals which are modified, particularly preferably in terms of the amplitude and/or the shape and/or the timing and/or the time profile, is provided in the motor vehicle. In this way, it is possible to become free of the necessity to convert, for example, the signal of the power command signal generator "power P2=2 P1" immediately into a corresponding reduction in the demand for electrical power without modification. Particularly preferred modifications are conversion into a signal sequence with ramped timing (i.e. transition in a plurality of relatively small steps instead of transition in a single large step) and modification by "installation", in particular an initial time delay in the reduction in the demand for electrical power. In the first-mentioned case there is an increase in the driving comfort and closer adherence to the operating point with optimum consumption; however, the transition lasts somewhat longer. In the second case mentioned, the temporary reduction in the demand for electrical power becomes active later and the "system" waits to determine whether the driver possibly requires a relatively low power level again after a short time. In this way, quick rising and falling of the desired power level is leveled out. It is also possible to convert the original signal of the power command signal generator for part of the period into a ramped signal sequence and to leave the remaining period, preferably the initial part of the period, unmodified. In this remaining period, a power change corresponding to the difference between the full level and the ramped part is enabled. This leads to a spontaneous initial reaction to increased power demand. It is preferred if the modification device contains a plurality of modification methods stored in it and it is possible to choose between the modification methods, preferably by means of an operator control on the dashboard of the motor vehicle.

The power command signal generator preferably has a mechanical element, preferably a pedal, which can be operated by the driver of the vehicle, and a transducer which converts the position and/or the change in the position of the mechanical element into electrical signals.

The previously described modification device can, in particular, be combined physically with the electronic control system or combined physically with the transducer, or physically constitute a separately embodied component. The electronic control system does not, of course, need to be a component which is integrated to form a single physical unit but rather can be distributed, if this is more practical, between a plurality of components which are physically separate.

The electronic control system is preferably embodied and capable of operating in such a way that, with the aforesaid control with respect to a combination which is favorable for fuel consumption, it also takes into account the instantaneous power demand of secondary current loads. This may be done, for example, by means of the electronic control system for the overall electrical output power of the generator. However, it is also possible to pick out individual secondary loads, in particular those with a comparatively large power demand.

It is to be noted that all the statements which have been made with respect to the device aspect of the invention, in particular in connection with preferred developments of the invention, apply analogously also to the method aspect of the invention. The method according to the invention can be developed with one or more of those features which have been described as preferred features in conjunction with the device part of the invention.

It is expressly stated that the invention also teaches the alternative or additional possibility of treating secondary loads (for example hydraulic pump, impeller wheel for cooling) which are driven mechanically by the internal combustion engine in an analogous fashion to those described previously for secondary current loads. That is to say in particular temporarily reducing the electrical power demanded by the electric motor and/or by at least one secondary current load when the secondary load is connected into the circuit mechanically. Or in particular temporarily reducing the demand for mechanical drive power for that secondary load or some other secondary load at the transition to a higher power state of the electric motor and/or of the secondary current load.

The invention and developments of the invention will be explained in more detail below with reference to an exemplary embodiment which is illustrated in a schematic fashion, and with reference to an exemplary flow chart.

Figure 1:
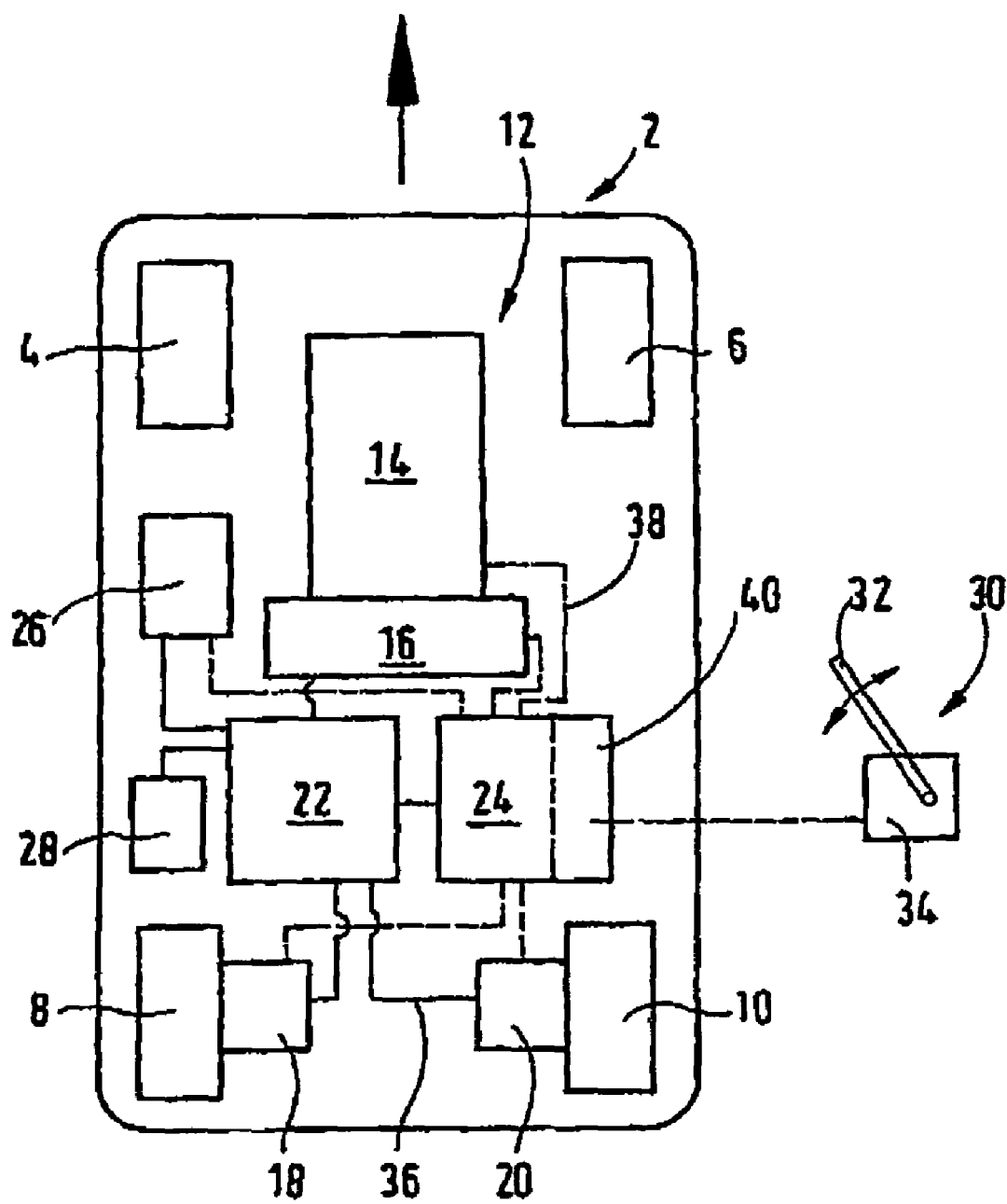
FIG. 1 shows a schematic plan view of a land motor vehicle, specifically a four-wheel passenger car, referred to below as "vehicle" for short.

The vehicle 2 which is illustrated has a left-hand front wheel 4, a right-hand front wheel 6, a left-hand rear wheel 8 and a right-hand rear wheel 10. An internal combustion engine-generator unit 12, comprising essentially an internal combustion engine 14 and a generator 16 which generates electrical current, is arranged spatially essentially between the front wheels 4 and 6. The internal combustion engine 14 may be a spark ignition engine or a diesel engine. Alternatively, other internal combustion engines are possible, for example natural gas motors, hydrogen motors or other thermal power machines, for example a Stirling engine or a gas turbine or a steam engine. The generator 16 is arranged with its shaft coaxially with respect to the crank shaft of the internal combustion engine 14. It may be a generator of the external rotor design. The generator 16 may be equipped, preferably on the rotor, with permanent magnets, preferably samarium-cobalt permanent magnets or iron-neodyme permanent magnets.

A left-hand electric drive motor 18 is assigned to the left-hand rear wheel 8, and a right-hand electric drive motor 20 is assigned to the right-hand rear wheel 10. Instead of electric motors 18 and 20, a common electric motor could be provided. The electric motors 18 and 20 could be provided for the front wheels 4 and 6 instead of for the rear wheels 8 and 10. It is also possible to provide four electric motors for driving all four wheels 4 to 10. The electric motors 18 and 20 may either operate directly on the rear wheel 8 or on the rear wheel 10. Alternatively, an intermediate transmission could also be provided in each case. An intermediately positioned drive shaft is also possible in each case.

An electronic power system 22 is symbolized by a rectangle, an electronic control system 24 is symbolized by a rectangle, and a typical electrical secondary load 26 is symbolized by a rectangle, these being typically vehicle headlights, rear lights of vehicles, heatable rear windshield, electrically driven air conditioning system, electrically driven cooling fan for the cooling fluid of the internal combustion engine, electrically activated brakes, or an electrically driven power steering system. In addition, an onboard vehicle battery 28 is shown for the sake of completeness.

In addition, a travel command signal generator 30, here specifically in the form of a pedal 32 which can be activated by the driver's foot, is shown as a power command signal generator. A transducer 34 is assigned to the pedal 32 and outputs signals as a function of the angular position of the pedal 32.

The electronic power system 22 is, as indicated by the continuous lines, connected by power cables 36 to the generator 16, the electric motors 18 and 20, the secondary load 26 and the battery 28. Instead of a single secondary load 26, a plurality of secondary loads would also of course be conceivable.

In the example described here, the secondary loads 26 are coupled to the drive system via the electronic power system 22. However, it is equivalent in terms of energy if secondary loads are coupled to the internal combustion engine in a directly mechanical fashion (for example hydraulic pump).

The electronic control system 24 is, as indicated by broken lines, connected by means of signal lines 38 to the internal combustion engine 14, the generator 16, the travel command signal generator 30, the electric motors 18 and 20, the electronic power system 22 and the secondary load 26 or the secondary loads. In the present exemplary embodiment, a modification device 14 is combined physically with the electronic control system 24.

If the electronic control system 24 receives, from the travel command signal generator 30 or the transducer 34, a signal which represents an increased power demand of the driver for the electric motors 18 and 20, the supply of electrical power to the electric motors 18 and 20 is firstly temporarily reduced—in conjunction with the electronic power system 22. Virtually simultaneously with the start of this reduction, the power output level of the internal combustion engine 14 is increased either directly by means of an increased injection quantity or indirectly by means of a greater degree of opening of the throttle valve, and increased fuel supply as a consequence thereof. The power output of the generator 16 is firstly reduced owing to the power reduction for the electric motors 18 and 20. The excess is thus available for the acceleration power of the internal combustion engine 14. In the dynamic adjustment, the power output of the generator 16 then also increases again, it being possible to provide active controlled rectifiers (for example physically assigned to the generator 16 or to the electronic power system 22) for the power drain from the generator 16. The available, higher electric power is fed to the electric motors 18 and 20, with the involvement of the electronic power system 22. The electronic control system 24 specifies when, and with which time profile, the system is to change from the reduction state of the supply of electrical power to the electric motors 18 and 20 to the state in which the entire available electrical power is supplied.

By means of the modification device 40 it is possible to modify the signals coming from the converter 34 to the electronic control system 24 and modify the reaction of the electronic control system 24 to the signals. Examples of specific preferred modifications have been given above.

With the vehicle 2 it is also possible to take into account the power demand of the secondary load 26, for example when it is switched on or put at a higher setting, specifically also by means of a temporary reduction in the supply of electrical power to the electric motors 18 and 20, until the internal combustion engine 14 has been changed to a higher power. This can either be performed even if the pedal 32 is in an unchanged position or alternatively in combination with a change in the pedal position. The secondary load 26 can also be connected via the modification device 40 to the electronic control system 24 in order to modify its signals or the reaction of the electronic control system 24 to the signals in a desired way.

The electric motors 18 and 20 may be electronically commutated electric motors. The electric motors 18 and 20 may be equipped, in particular on the rotor, with permanent magnets, the same which has been said above in conjunction with the generator 16 applying to the preferred permanent magnetic material. The electric motors 18 and 20 may be embodied as an internal rotor design or an external rotor design.

As the functions of the electronic control system 24, the modification device 40 and of the converter 34 have been described above in detail, it is easily possible for the average person skilled in the art to use his specialist knowledge to make available specific electrical circuits which implement these functions. This is possible with commercially available electronic components.

After the previous description has been studied it is easy to conceive how the electrical power demanded by the secondary current load 26 can be temporarily reduced instead of the temporary reduction in the electrical power demanded by the electric motors 18 and 20, or in addition to this reduction. If, as in the past, the electronic control system 24 receives, from the travel command signal generator 30 or the transducer 34, a signal which represents an increased power demand of the driver for the electric motors 18 and 20 (and/or if a higher power state is demanded by switching on a high-power secondary power load—not explicitly shown), the supply of electrical power to the secondary load 26 is at first temporarily reduced—in conjunction with the electronic power system 22. Virtually simultaneously with the start of this reduction, the power output of the internal combustion engine 14 is increased either directly by means of an increased injection quantity or indirectly by means of a greater degree of opening of the throttle valve, and as a consequence of this increased fuel supply. The power output level of the generator 16 is firstly reduced owing to the power reduction for the secondary load 26. The excess is thus available for the acceleration power of the internal combustion engine. In the dynamic adjustment, the power output level of the generator 16 also then rises again. The high electrical power which is available is supplied to the secondary load 26, with the involvement of the electronic power system 22. The electronic control system 24 specifies when and with which time profile there will be a transition from the reduction state of the supply of electrical power to the secondary load 26 to the state in which the entire available electrical power is supplied.

Figure 2:
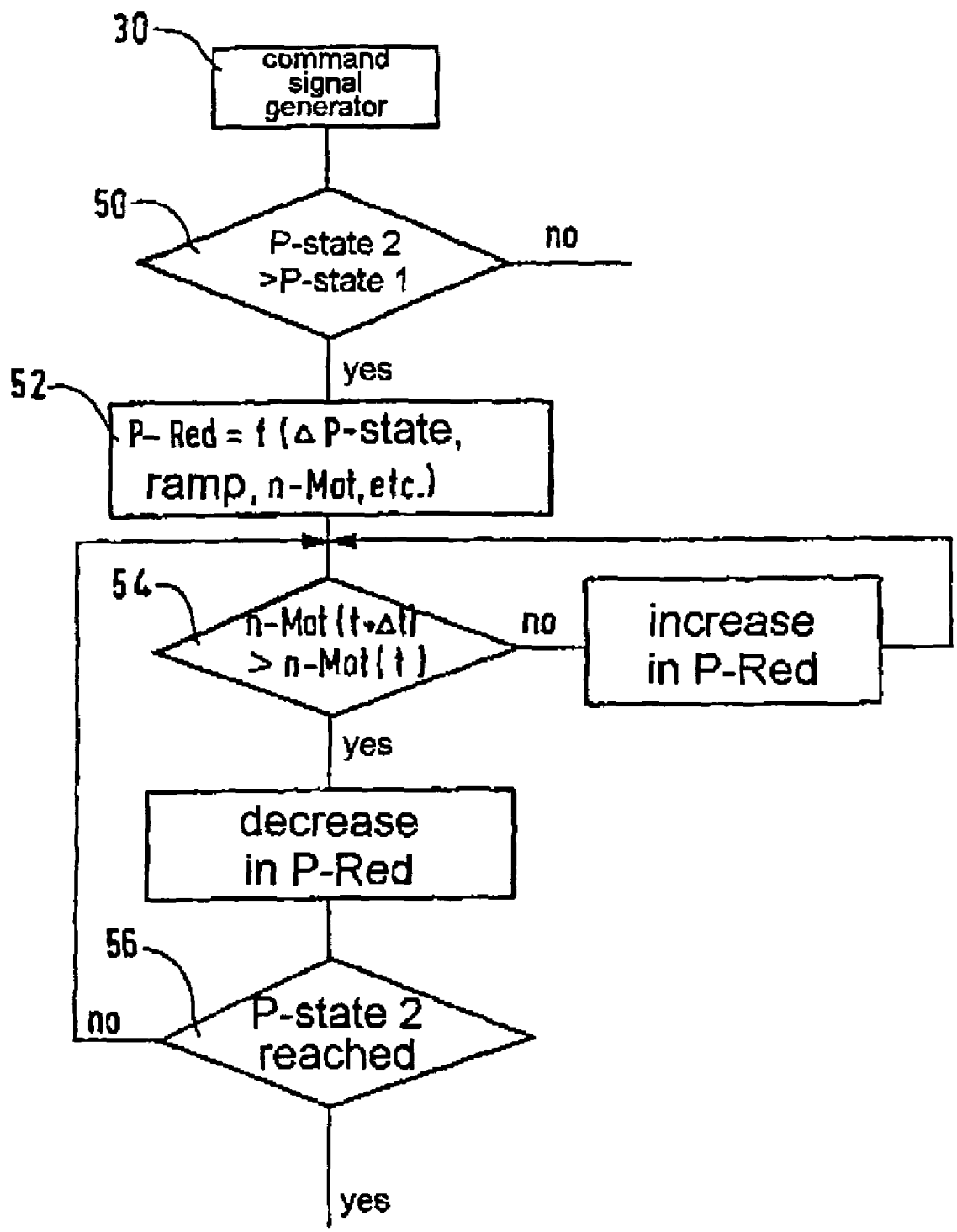
FIG. 2 shows a flow chart representing the temporary reduction in the demand for electrical power.

The "electronic sequence" at the transition to an operating phase with a higher power state of the electric motors 18 and 20 will be explained using the flow chart illustrated in FIG. 2.

The signal coming from the command signal generator 30 is firstly evaluated in a decision box 50 to determine whether or not the currently desired power state 2 is greater than the previous power state 1. If it is, a power reduction P-Red, i.e. a power level by which the power demand in the "old" power state 1 (!) is temporarily reduced is defined in a box 52. P-Red is determined or calculated in the specific embodiment as a function of a plurality of parameters. The circle of typical parameters includes the difference between the desired "new" power 2 and the previous "old" power 1, the current rotational speed of the internal combustion engine, any modification (as described in detail in the application, for example consideration with ramped timing), and other possible parameters.

In a decision box 54 it is evaluated whether the rotational speed of the internal combustion engine 14 is greater after a suitably short time interval Δt than at the start of the time interval Δt. If not, P-Red is increased. If it is, P-Red is decreased. In a decision box 56 it is then checked whether the desired power state 2 has already been reached. If it has, P-Red is set to 0. If not, processing continues with the decreased, current P-Red.

An entirely analogous "electronic sequence" can be used if, when increased power of the electric motors 8 and 10 is desired, the temporary power reduction according to the invention is operated with a secondary current load. In this case, P-Red is determined or calculated for a secondary current load and performed at this secondary current load.

The "electronic sequence" can be seen as an analogy in the case in which the "new" desired power level 2 is triggered by connecting a secondary power load into the circuit. The variable "power state 2" is then derived in fact from the respective secondary current load which is to be switched on or put at a higher setting or, for example, from the sum of the high-power secondary current load or, for example, from the sum of the high-power secondary current loads and the electric motors. The same applies to the "old" power state 1.

The invention claimed is:

1. A method for operating a non-rail bound land motor vehicle operable in essentially steady-state operating phases and having a drive system comprising an internal combustion engine-generator unit; at least one electric drive motor; a power command signal generator operable by a driver of the motor vehicle, for the at least one electric drive motor; and an electronic control system connected to the internal combustion engine-generator unit, to the electric motor, and to the power command signal generator, the method comprising:

controlling the internal combustion engine-generator unit with the electronic control system so that the motor vehicle is operated in the essentially steady-state operating phases with respective combinations of supplied torque and rotational speed of the internal combustion engine which are favorable to fuel consumption; and in association with a transition from a first operating phase of the motor vehicle having a first power state of the at least one electric drive motor and/or at least one secondary current load to a second operating phase of the motor vehicle having a higher second power state of the at least one electric drive motor and/or the at least one secondary current load, temporarily reducing the electrical power demanded by the at least one electric drive motor and/or by the at least one secondary current load so that the total electrical power demanded by the at least one electric drive motor and/or by the at least one secondary current load is smaller than before the temporary reduction, a magnitude of the temporary reduction in the demand for electrical power by the at least one electric drive motor and/or by the at least one secondary current load varying as a function of the difference between the first power state and the higher, second power state, whereby a faster transition of the internal combustion engine from a first power output level to a higher second power output level is achieved.

2. A non-rail bound land motor vehicle operable in essentially steady-state operating phases and having a drive system comprising an internal combustion engine-generator unit;
at least one electric drive motor;
a power command signal generator, operable by the driver of the motor vehicle, for the at least one electric drive motor; and
an electronic control system connected to the internal combustion engine-generator unit, to the electric motor, and to the power command signal generator, the electronic control system being embodied and operable to control the internal combustion engine-generator unit so that the motor vehicle is operated in the essentially steady-state operating phases with respective combinations of supplied torque and rotational speed of the internal combustion engine which are favorable to fuel consumption, and wherein, in association with a transition from a first operating phase of the motor vehicle having a first power state of the at least one electric drive motor and/or at least one secondary current load to a second operating phase of the motor vehicle with a higher second power state of the at least one electric drive motor and/or of the at least one secondary current load, the electronic control system is embodied and operable to temporarily reduce the electrical power demanded by the at least one electric drive motor and/or by at least one secondary current load so that the total electrical power demanded by the at least one electric drive motor and/or by the at least one secondary current load is smaller than before the temporary reduction, and wherein the elctronic control sytem is further embodied and operable so that a magnitude of the temporary reduction in the demand for electrical power by the at least one electric drive motor and/or by the at least one secondary current load varies as a function of the difference between the first power state and the higher, second power state, whereby a faster transition of the internal combustion engine from a first power output level to a higher second power output level is achieved.

3. The motor vehicle as claimed in claim 2, wherein the electronic control system is further embodied and operable so that a duration of the temporary reduction in the demand for electrical power by the at least one electric drive motor and/or by the at least one secondary current load varies as a function of the difference between the first power state and the higher, second power state.

4. The motor vehicle as claimed in claim 2, wherein the electronic control system is further embodied and operable to dynamically adapt the magnitude and/or a duration of the temporary reduction in the demand for electrical power by the at least one electric drive motor and/or by the at least one secondary current load to an instantaneous difference between an instantaneous power level and the second power output level during the transition from the first power output level to the higher second power output level.

5. The motor vehicle as claimed in claim 2, wherein the power command signal generator includes a mechanical element adapted to be operated by the driver of the vehicle; and a transducer configured to convert a position and/or a change in the position of the mechanical element into an electrical signal.

6. The motor vehicle as claimed in claim 2, further comprising an electronic modification device adapted to convert a signal from the power command signal generator and/or a signal reflecting power consumption of the at least one secondary current load into a modified signal.

7. The motor vehicle as claimed in claim 6, wherein the signal from the power command signal generator and/or the signal reflecting the power consumption level of the at least one secondary current load is modified in terms of amplitude and/or shape and/or timing and/or a time profile.

8. The motor vehicle as claimed in claim 6, wherein the modified signal has a ramped amplitude over time.

9. The motor vehicle as claimed in claim 8, wherein an amplitude of the modified signal is ramped only for a part of its duration.

10. The motor vehicle as claimed in claim 6, wherein the modified signal contains a time delay for the temporary reduction of the demand for electrical power.

11. The motor vehicle as claimed in claim 6, wherein the electronic modification device contains a plurality of modification methods stored therein, the modification methods being selectable.

* * * * *